(12) United States Patent
Van de Sanden et al.

(10) Patent No.: US 8,796,584 B2
(45) Date of Patent: Aug. 5, 2014

(54) METHOD OF MANUFACTURING A BEARING COMPONENT WITH VISUALLY UNDETECTABLE MARK; BEARING COMPONENT WITH SUCH MARKING; METHOD OF AUTHENTIFICATION SUCH MARKING

(75) Inventors: John Van de Sanden, Nieuwegein (NL); Hendrik Johannes Krock, Sleeuwijk (NL); Hendrik Anne Mol, Sleeuwijk (NL)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/517,450

(22) PCT Filed: Dec. 22, 2009

(86) PCT No.: PCT/EP2009/009210
§ 371 (c)(1),
(2), (4) Date: Aug. 24, 2012

(87) PCT Pub. No.: WO2011/076230
PCT Pub. Date: Jun. 30, 2011

(65) Prior Publication Data
US 2012/0312781 A1 Dec. 13, 2012

(51) Int. Cl.
*B23K 26/00* (2014.01)
(52) U.S. Cl.
USPC .................................................. 219/121.69
(58) Field of Classification Search
USPC .................................................. 219/121.69
See application file for complete search history.

(56) References Cited

U.S. PATENT DOCUMENTS

| | | | |
|---|---|---|---|
| 4,335,295 A * | 6/1982 | Fowler | 219/121.85 |
| 6,527,193 B1 | 3/2003 | Beli et al. | |
| 7,469,831 B2 * | 12/2008 | Gu et al. | 235/454 |
| 2008/0153698 A1 | 6/2008 | Kawahara et al. | |

FOREIGN PATENT DOCUMENTS

| | | |
|---|---|---|
| EP | 0773505 A2 | 5/1997 |
| FR | 2755902 A1 | 5/1998 |
| JP | 8267260 A | 10/1996 |
| JP | 2006342870 A | 12/2006 |
| WO | WO2007020257 A1 | 2/2007 |

* cited by examiner

*Primary Examiner* — Dana Ross
*Assistant Examiner* — Renee L Miller
(74) *Attorney, Agent, or Firm* — Bryan Peckjian; SKF USA Inc. Patent Department

(57) ABSTRACT

The present invention relates to a method of manufacturing a bearing component, in which a visually undetectable identification mark is created on a surface of the component by means of laser marking performed in a protective gas environment. The protective gas environment prevents the formation of a visible oxide layer, while the temperatures induced at the component surface and below the component surface, due to the laser marking, are sufficient to alter the microstructure of the bearing steel from which the component is made. The altered microstructure is revealable by applying an etchant to the visually undetectable mark, thereby allowing authentication of the bearing component.

14 Claims, 1 Drawing Sheet

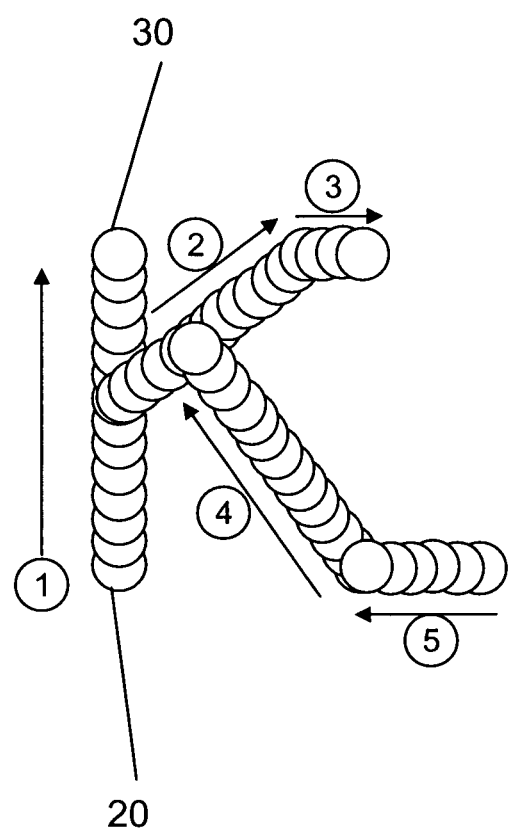

METHOD OF MANUFACTURING A BEARING COMPONENT WITH VISUALLY UNDETECTABLE MARK; BEARING COMPONENT WITH SUCH MARKING; METHOD OF AUTHENTIFICATION SUCH MARKING

CROSS-REFERENCE

This application is the U.S. national stage of International Application No. PCT/EP2009/009210 filed on Dec. 22, 2009.

TECHNICAL FIELD

The invention relates to a method of manufacturing a component made of hardened bearing steel, in which a surface of the component is provided with a visually undetectable identification mark.

BACKGROUND OF THE INVENTION

Laser marking is commonly used on bearing components, to provide the component with e.g. a type number. Laser marking for bearing steels is based on the changes that develop in the material due to the heating of the steel by the laser radiation. Various ways of laser marking may be distinguished. Some of them are described hereafter. Engraving is the removal of material to a depth of 10 to 50 µm. The laser is used to create a groove in the material and due to melting and evaporation, material may be removed to form the groove. Ablation is the evaporation of material by extremely fast laser pulses. The processed material evaporates and fumes are exhausted to prevent re-deposition. For metallic pieces ablation may be used, for example, for surface patterning or for drilling extremely fine holes. Tempering, also called annealing, is the main method for marking steel components. The heat of the laser tempers the steel which changes reflectivity and/or surface structure, leading to a visible mark.

WO2007/020257 discloses a method of marking a metallic object by local conversion of its metallic structure, for example by heating with a laser. This document describes that the conversion takes place through the thickness of the piece to be marked.

It is also known to create marks through the modification of the structure or internal stress within materials, for example by laser treatment. According to U.S. Pat. No. 6,527,193, this creates local deviations in the magnetic, acoustic or electric properties of the marked material, these deviations being hidden to the eye but readable with appropriate instruments.

SUMMARY OF THE INVENTION

In a first aspect, the invention provides a method of manufacturing a bearing component comprising steps of forming the component from a bearing steel, hardening the component, and laser marking a surface of the component with an identification mark. According to the invention, the step of laser marking is performed in a protective gas environment, such that the identification mark is visually undetectable with the naked eye. The visually undetectable mark is revealable by applying an etchant to the component surface where the mark is present, thereby allowing the component to be authenticated in a straightforward manner.

During the step of laser marking, temperatures are induced at the component surface and in the subsurface which are sufficient to alter the microstructure of the bearing steel from which the component is made. Preferably, temperatures are induced which temper the bearing steel in the laser-marked region. As a result, in the marked region, part of the alloy elements, in particular the carbide formers (e.g. Cr, V, Mo), may form very small carbide precipitates in the microstructure of the steel. When an etchant such as Nital is applied to the marked region, the etchant attacks the interfaces between the small precipitates and the steel matrix and attacks the different phases in the steel at different rates. Typically, the etched identification mark will appear darker than neighbouring regions of the component surface.

In a preferred embodiment, the step of laser marking comprises inducing a temperature of between 300 and 500° C. at a depth of between 0.1 and 0.2 mm below the component surface. Suitably, the marked component surface is tempered to a depth of less than 0.3 mm. This ensures that temperatures are not induced at the surface which would cause the bearing steel to melt. After solidification, it is likely that the melted zone would be optically visible. Furthermore, the marked component surface is preferably tempered to a depth of greater than 0.05 mm, to ensure that if a portion of the tempered layer gets worn off, the mark remains revealable by etching.

An advantage of creating the identification mark by means of tempering is that the laser can be used on a relatively low power setting, which saves energy. Furthermore, when the mark is provided on e.g. an outer circumference of a bearing outer ring, the relatively low temperatures induced means that there is no risk of adversely affecting the hardness of the outer raceway.

If laser marking by means of tempering, as described above, were performed in an ordinary air environment, the mark created would be visually detectable. Contaminants are inevitably present on the surface of a bearing component, and it is practically impossible to render the surface absolutely clean. Thus, even at the low power settings necessary to temper the component surface to a depth of approximately 0.05 mm, the laser beam will char surface contaminants due to a reaction with oxygen in the air. The resulting mark will be visible. This mark can, of course, be polished off, but this adds a step to the manufacturing process. Therefore, according to the invention, the step of laser marking is performed in a protective gas environment, which prevents the formation of visible oxides, and allows a visually undetectable mark to be created in a single step.

In a further embodiment, the method of manufacturing according to the invention comprises a step of laser-marking a surface of the bearing component with a visible identifier. The visible identifier can be the manufacturer's logo in combination with e.g. a product type number and/or serial number. Typically, this step of visible laser marking is performed immediately prior to a step of final assembly. Preferably, the step of providing a visually undetectable mark and the step of providing a visible identifier are performed using the same laser. Suitably, the step of visible laser marking is performed in an air environment and may be performed using higher power settings than the "invisible" laser marking.

The step of providing the visually undetectable mark may be performed before or after the visible identifier is created on the component surface. In an advantageous embodiment, the visible identifier is created afterwards, and is provided at least partly on top of the visually undetectable mark. The advantage of this embodiment is that copying is rendered even more difficult.

According to a second aspect, the invention relates to a bearing component provided with a visually undetectable identification mark, whereby the mark is created by laser marking a surface of the component in a protective gas environment.

According to a third aspect, the invention provides a method of authenticating a bearing component provided with a visually undetectable identification mark as described hereinabove. The mark is revealed and becomes readable after an etchant is applied to the surface of the component where the identification mark is present. Etching is a very simple way of rendering the marking visible, and there is no need for a complex process in a laboratory or for instruments or machines.

Once revealed, the mark is easily read with the eye, possibly with a magnifying glass or an optical microscope. The mark comprises one or more symbols and may suitably constitute an identification code which corresponds to an identification code stored in a manufacturer's database. A revealed code can therefore be checked against the database to verify the authenticity of the bearing component.

In one embodiment, the code uniquely identifies the component. In another embodiment, the revealed code in combination with at least a second variable constitute a unique identifier of the component. The second variable may be, for example, the location of the hidden mark on the component, a relative spacing of consecutive symbols, an article number or serial number of the component, a manufacturing date, a manufacturing site etc. In a still further embodiment, the revealed code is one of a set of identifiers that is linked to a particular manufacturing batch and/or manufacturing date and/or manufacturing site etc. The identification mark can be a character string, or can also be encrypted code such as a barcode.

In one preferred embodiment, the identification mark comprises encrypted information. Suitably, the step of laser marking then comprises using predetermined start and stop locations of the laser beam in order to form at least one symbol of the mark, which symbol comprises at least one continuous line. After etching, it is possible to determine from the revealed mark the locations where the continuous line started and stopped. Consequently, the encrypted information may comprise the start/stop locations of the at least one continuous line. When the mark comprises a plurality of symbols having at least one continuous line, the start/stop locations of each continuous line advantageously form part of the encrypted information. When the mark comprises one or more symbols having at least two intersecting continuous lines, the step of laser marking may suitably comprise using a predetermined sequence to form each continuous line. The sequence used is also discernable from the revealed mark, meaning that also the predetermined sequence may form part of the encrypted information. The encrypted information may be linked to a manufacturing site and/or manufacturing date etc., which information is then decrypted in order to identify or authenticate the bearing component in question. A variety of further alternatives are possible to authenticate the component and to render counterfeiting almost impossible.

When the component marked according to the present invention is a component of a rolling element bearing, the mark may be created on any non-rolling contact surface of the bearing; for example, on an end of a roller, on an outer circumference of the bearing outer ring or on a side face of a bearing ring. The mark is not provided on a raceway of the bearing, since the bearing raceway must satisfy strict hardness requirements in order to withstand rolling contact fatigue. Laser marking of a raceway surface would compromise hardness and is thus inadvisable. The method according to the present invention may also be used to manufacture a ring of a plain bearing or a component of a linear bearing.

Laser marking according to the present invention may be made with various laser types, e.g. solid state lasers (Nd:YAG lasers, fibre lasers) or $CO_2$ lasers. Lasers producing pulses of radiation or, alternatively, continuous wave lasers may be used. In preferred embodiments, at least one, or preferably more than one of the following laser conditions are applied:

Power: preferably at least 10 W or 15 W, more preferably at least 20 W or 25 W; preferably at most 100 W or 80 W, more preferably at most 60 W or 50 W.

Focal diameter: 10 to 50 µm

Pulsed laser frequency: preferably at least 1 kHz or 5 KHz, more preferably at least 10 or 20 KHz; preferably at most 1000 kHz or 500 KHz, more preferably at most 100 or 80 KHz.

Mirror accuracy: 50 µm

Speed: 100 to 200 mm/sec, preferably around 150 mm/sec

These conditions may vary significantly according to the type of laser used and may also vary according to the material of the bearing component to be marked. Preferably, the laser is set to induce temperatures of between 200-500° C. at a depth of around 0.15-0.2 mm under the surface of the component to be marked.

When it becomes necessary to detect whether the mark is present or not, or to examine or read it, the surface where the mark is expected to be present is etched. In a preferred embodiment, the etching step is carried out by contacting the surface of the bearing component with an acid, for example a solution of nitric acid with alcohol. After a few seconds, the mark may then appear and become readable. The mark is read optically, preferably with the naked eye. Alternatively, a magnifying glass or an optical microscope may be necessary to correctly read the mark. In another embodiment, an optical reader, e.g. for reading bar-codes, may be used.

Etching the bearing component surface of a counterfeit product may reveal the absence of a mark that a genuine product would have had. Alternatively, when a mark is revealed it may be compared with stored data, e.g. a database maintained by the manufacturer of genuine bearing components, to verify its authenticity.

Embodiments of the invention will now be described, by way of example only, with reference to the accompanying drawing.

BRIEF DESCRIPTION OF THE DRAWING

FIG. 1 is a schematic plan view of an alphanumeric character created using a laser beam.

DETAILED DESCRIPTION OF THE INVENTION

In one embodiment of the invention, a bearing ring is manufactured. First a blank is formed by pressing and turning; it is then soft machined by grinding. After these first steps, the bearing ring is hardened, which comprises heating to a temperature within the range 750 to 900° C., followed by rapid cooling. Typically, side faces of the ring then undergo a step of material removal in which 0.1-0.2 mm of material is removed by grinding. Next, a raceway is hard machined in the bearing ring by grinding, the raceway is honed and the ring is washed.

In a subsequent step, an invisible symbol or symbols comprising, for example, a unique identification number, is created with a laser beam, on a non-rolling contact surface of the ring. Suitably, a side surface of the ring is laser-marked. The symbol or symbols such as an identification number is entered into a manufacturer's database. In one example, the laser used is a Nd:YAG laser. The laser may be set to a power of 30 W, a speed of 200 mm/s, a focal diameter of 30 μm and a frequency of 35 kHz. Further, a stream of shielding gas such as helium or argon is directed towards the surface to be marked. As a result, air is displaced and no oxygen is available for a reaction with contaminants on the component surface, thereby preventing the formation of a visible oxide layer. The laser beam does, however, modify the steel microstructure.

The modification will briefly be explained with regard to a bearing ring that has undergone a martensitic hardening treatment. This treatment involves heating the bearing steel to the austenitic phase, holding it there until part of the carbon present in the alloy has dissolved, followed by rapid cooling. Upon being rapidly cooled, the main portion of the austenite transforms into martensite, which is a microstructure formed in steel when the austenite phase is cooled too rapidly for carbon to diffuse out of solid solution. The entrapped carbon distorts the resulting crystal lattice, and a steel microstructure is formed that is extremely brittle and hard. Hardness is required in order for a bearing raceway to withstand rolling contact fatigue, but the bearing must also possess toughness. After quenching, the steel is therefore tempered, which involves reheating the steel for a period of time, to allow some of the entrapped carbon to diffuse out of the crystal lattice and precipitate as carbides. Tempering is performed until the steel achieves the necessary toughness, while retaining a sufficient hardness.

Thus, when the surface of a martensitically hardened bearing ring is marked using a laser beam, the result is localized reheating of the marked surface and an underlying region. The laser settings specified above will induce a temperature of around 300° C. at a depth of approximately 0.2 mm below the ring surface. At such a temperature, the tempering process described above is continued and more entrapped carbon will diffuse and precipitate as carbides. Therefore, the marked surface and the underlying region have a different microstructure from unmarked regions of the bearing steel. The altered microstructure is not visible with the naked eye, but becomes distinguishable from unaltered regions when an etchant such as Nital is applied. The etchant attacks the different phases in the steel microstructure at different rates, and the invisible laser marking is revealed.

The step of laser marking in the method of the invention can also be performed before the bearing ring as a whole is subjected to the martensitic hardening treatment (or any other hardening). In effect, the laser marking according to the invention is a localized heat treatment which unmarked regions of the bearing ring do not undergo. The marked bearing steel therefore experiences relatively more tempering and has a microstructure which is distinguishable from unmarked bearing steel.

In a further embodiment, a bearing ring is provided with a visually undetectable mark according to the invention and is further provided with a second identification mark that is intended to remain visible. The visible identification mark is also produced using a laser, whereby the visible laser marking is suitably conducted without the use of a shielding gas. Preferably, the same laser is used to create both the visually undetectable mark and the visible mark. It may help to know where the visually undetectable mark is present, if both are created side by side. In an advantageous embodiment, the visible mark is at least partially created on top of the visually undetectable mark, to make the bearing component even more difficult to replicate. Suitably, the two marks may overlap each other by a predetermined amount.

When somebody wishes to verify if a bearing ring is a counterfeit or a genuine part, an etchant is applied to the surface of the ring where the mark is expected to be present. If the visible mark has been created on top of the hidden mark, it may be necessary to polish away at least part of the visible mark using e.g. an abrasive cloth. The etchant may be applied using e.g. an ear-bud, which is rubbed over the ring surface. After a few seconds' exposure, the mark is revealed and readable with the naked eye. The mark may then be compared to data stored in a manufacturer's confidential database, to check if the mark is authentic.

A suitable etchant for revealing the authentication mark made on a bearing component is Nital, which is a solution of nitric acid in ethanol. A 2% solution is commonly used. For components made of stainless steel, Vilella's Reagent may be employed, which is a solution of picric acid and hydrochloric acid in ethanol. Other etchants such as Picral and Glyceregia may also be used according to the steel grade from which the bearing component is made.

The mark provided on a bearing component in accordance with the invention may be a character string comprising symbols and/or numerals and/or alphabetic letters etc. The mark may also be an encryption, such as a barcode. In a further embodiment, the mark comprises at least one symbol that contains an embedded encryption. In other words, in addition to the information conveyed by the symbol itself, the symbol comprises encrypted information that must be decrypted to extract the underlying data.

It has been found that after etching of a visually undetectable laser marking which comprises one or more symbols having at least one continuous line, it is possible to discern the start location and the stop location of each continuous line. This is because segments of the continuous line which have received relatively more energy from the laser beam are discernible from segments which have received relatively less energy. For example, "overlaps" are discernible. The term overlap is used to refer to a line segment where the laser beam continues the line partially on top of an already-formed segment. This can be clearly seen in FIG. 1, which shows an example of a symbol after it has been created using a laser beam. For obvious reasons, the symbol of FIG. 1 is a visible laser mark, but the same principles apply to an invisible laser mark created in a protective gas environment.

In this example, the mark consists of the letter K and comprises five continuous lines: a first line 1, a second line 2, a third line 3, a fourth line 4, and a fifth line 5. The laser used imparts energy in pulses, and each line therefore comprises a sequence of overlapping individual segments, which are indicated by circles in FIG. 1. With reference to the first line 1, it can be seen that the line was started at a start location 20 and was stopped at a stop location 30, since the stop location 30 consists of a "circle" that lies on top of the previous circle. Consequently, it is possible to determine that each line 1, 2, 3, 4, 5 was created in the direction indicated by the corresponding arrow, and that the lines were created in sequential order starting with the first line 1 and finishing with the fifth line 5.

When the laser beam reaches the end of the first line 1, the laser beam is deactivated and is then reactivated when the beam is at point approximately midway along line 1, in order to create the second line 2. At this point where the first and second lines 1, 2 intersect, the bearing steel has been subjected to a more intensive heat treatment than non-intersecting parts on the two lines. The result, again, is a discernible change in microstructure that is revealable by etching as described previously. Thus, in one embodiment of the invention, the step of providing the visually undetectable laser mark comprises using predetermined start and stop locations of the laser beam to form each continuous line of the one or more symbols which make up the identification mark. In this way, an encryption is embedded within an already hidden code. The encrypted information may comprise the start/stop location of one particular line. Preferably, the encrypted information comprises the start/stop location of each continuous line.

At the end of the second line 2, the beam must change direction in order to create the third line 3. At the point where the beam changes direction, the beam stays in one place for a relatively longer time than if the beam is moving, meaning that this point receives more energy than neighbouring points. The resulting microstructural differences in the bearing steel are again revealable by means of etching. Consequently, the use of predetermined start/stop locations of the laser beam is not limited to the end points of each continuous line. The laser may be programmed such that the laser beam is deactivated at a predetermined location along the line, then reactivated at the same location to complete the line. Alternatively, the laser may be programmed to linger at the predetermined location, such that relatively more energy is imparted to the bearing steel at that location. Such locations may also form part of the encrypted information.

In a further development, a predetermined sequence is used to form each continuous line when the symbol comprises two or more intersecting continuous lines. Suitably, the sequence used then forms part of the encrypted information. Thus, the start/stop locations of the laser beam and the sequence used to create each symbol may be varied according to e.g. manufacturing site and/or manufacturing date and/or product type etc. Such an additional layer of encoding provides an even further protection against unauthorized copying A number of aspects/embodiments of the invention have been described. It is to be understood that each aspect/embodiment may be combined with any other aspect/embodiment. The invention may thus be varied within the scope of the accompanying patent claims.

The invention claimed is:

1. A method for providing an identification mark on a bearing component made from a bearing steel, comprising:
   hardening the bearing component;
   placing the bearing component in a protective gas environment; and
   while in the protective gas environment, applying a laser beam to a surface of the bearing component so as to raise a temperature of a depth of 0.05-0.3 mm below the surface to between 200-500° C. so as to alter the microstructure of the bearing steel but without melting the surface, wherein no oxidised surface layer forms on the surface and a tempered zone forms at and below the surface, which tempered zone is the identification mark and is visually undetectable with the naked eye.

2. The method according to claim 1, wherein the step of applying the laser beam is performed after the step of hardening.

3. The method according to claim 1, wherein the step of applying the laser beam is performed prior to the step of hardening.

4. The method according to claim 1, wherein the step of applying the laser beam is performed as a part of a finishing operation, prior to assembly of the bearing component in a bearing.

5. The method according to claim 1, wherein the step of applying the laser beam further comprises encrypting information within the identification mark.

6. The method according to claim 5, wherein the identification mark further comprises one or more symbols having at least one continuous line and the step of applying the laser beam further comprises using predetermined start and stop locations of the laser beam to form each continuous line.

7. The method according to claim 6, wherein the identification mark further comprises one or more symbols having two or more intersecting continuous lines and the step of applying the laser beam further comprises using a predetermined sequence to form each intersecting continuous line.

8. The method according to claim 1, wherein the method further comprises applying a second laser beam to the surface of the bearing component, wherein a visual identification mark generated by the second laser beam remains visible after the bearing component is assembled in a bearing.

9. The method according to claim 8, wherein the visual identification mark is provided at least partially on top of the identification mark, which is visually undetectable with the naked eye.

10. The method according to claim 8, wherein the visual identification mark and the identification mark, which is visually undetectable with the naked eye, are generated using the same laser.

11. The method according to claim 7, wherein the laser beam imparts energy in pulses, and each line comprises a sequence of overlapping individual segments.

12. The method according to claim 11, further comprising:
   applying a second laser beam to the surface of the bearing component,
   wherein:
   a visual identification mark generated by the second laser beam remains visible after the bearing component is assembled in a bearing,
   the visual identification mark is provided at least partially on top of the identification mark, which is visually undetectable with the naked eye, and
   the visual identification mark and the identification mark, which is visually undetectable with the naked eye, are generated using the same laser.

13. The method according to claim 12, wherein the protective gas environment consists of a stream of shielding gas selected from the group consisting of helium and argon.

14. The method according to claim 1, wherein the protective gas environment consists of a stream of shielding gas selected from the group consisting of helium and argon.

\* \* \* \* \*